US008490994B2

(12) United States Patent
Knopf

(10) Patent No.: US 8,490,994 B2
(45) Date of Patent: Jul. 23, 2013

(54) WHEELCHAIR FRAME AND WHEELCHAIR WITH CROSS-BRACE

(75) Inventor: Michael Knopf, Kaiserslautern (DE)

(73) Assignee: Sunrise Medical GmbH & Co. KG, Malsch/Heidelberg (DE)

( * ) Notice: Subject to any disclaimer, the term of this patent is extended or adjusted under 35 U.S.C. 154(b) by 202 days.

(21) Appl. No.: 12/809,818

(22) PCT Filed: Dec. 22, 2008

(86) PCT No.: PCT/EP2008/011016
§ 371 (c)(1), (2), (4) Date: Sep. 24, 2010

(87) PCT Pub. No.: WO2009/080347
PCT Pub. Date: Jul. 2, 2009

(65) Prior Publication Data

US 2011/0025014 A1 Feb. 3, 2011

Related U.S. Application Data

(60) Provisional application No. 61/008,806, filed on Dec. 21, 2007.

(51) Int. Cl.
*B62M 1/14* (2006.01)

(52) U.S. Cl.
USPC .................................... 280/250.1; 280/304.1

(58) Field of Classification Search
USPC ........................................... 280/250.1, 304.1
See application file for complete search history.

(56) References Cited

U.S. PATENT DOCUMENTS

| | | | | |
|---|---|---|---|---|
| 4,592,570 | A * | 6/1986 | Nassiri | 280/650 |
| 4,858,260 | A | 8/1989 | Failor et al. | |
| 5,076,390 | A * | 12/1991 | Haskins | 280/250.1 |
| 5,076,602 | A | 12/1991 | Robertson et al. | |

(Continued)

FOREIGN PATENT DOCUMENTS

| | | |
|---|---|---|
| BE | 529233 | 6/1954 |
| CA | 2581578 A1 | 3/2008 |

(Continued)

OTHER PUBLICATIONS

PCT Search Report, Int'l Appl. No. PCT/EP2008/011016.

(Continued)

*Primary Examiner* — Tashiana Adams
(74) *Attorney, Agent, or Firm* — MacMillan, Sobanski & Todd, LLC

(57) ABSTRACT

A wheelchair frame includes left and right first frame members, each having a first leg for supporting a seat. The first legs are arranged on opposite sides of a central axis of the wheelchair. At least one cross-brace is connected, by the ends, to the first legs of the left and right frame members. The cross-brace has a non-circular cross-section along a section between the ends. The wheelchair frame includes left and right second frame members that are pivotally connected to the left and right first frame members. The second frame members are foldable and may be fixed in a position in that is generally parallel to the first legs of the left and right first frame members. A cross-brace is connected, by the ends, to the left and right second frame members. The cross-brace has a non-circular cross-section along a section between the ends.

22 Claims, 5 Drawing Sheets

U.S. PATENT DOCUMENTS

| | | | | |
|---|---|---|---|---|
| 5,131,672 | A | 7/1992 | Robertson et al. | |
| 5,143,391 | A | 9/1992 | Robertson et al. | |
| 5,176,393 | A | 1/1993 | Robertson et al. | |
| 5,409,247 | A | 4/1995 | Robertson et al. | |
| 5,421,598 | A | 6/1995 | Robertson et al. | |
| 5,957,474 | A * | 9/1999 | Mundy et al. | 280/304.1 |
| 6,311,999 | B1 | 11/2001 | Kueschall | |
| 6,394,476 | B1 | 5/2002 | Molnar | |
| 6,419,253 | B1 | 7/2002 | Mascari | |
| 6,464,243 | B2 * | 10/2002 | Roche | 280/650 |
| 6,648,579 | B2 * | 11/2003 | Vartanian, Sr. | 414/546 |
| 7,134,678 | B2 | 11/2006 | Lindkvist et al. | |
| 7,455,362 | B2 * | 11/2008 | Hanson et al. | 297/363 |
| 7,891,696 | B2 * | 2/2011 | Hanson | 280/647 |
| 7,950,684 | B2 * | 5/2011 | Borisoff | 280/304.1 |
| 8,002,300 | B2 * | 8/2011 | Ludovici et al. | 280/250.1 |
| 2001/0011805 | A1 | 8/2001 | Kueschall | |
| 2003/0006578 | A1 * | 1/2003 | Melgarejo et al. | 280/250.1 |
| 2004/0104321 | A1 | 6/2004 | Marsolais et al. | |
| 2004/0188979 | A1 * | 9/2004 | Bernatsky et al. | 280/304.1 |
| 2005/0116440 | A1 * | 6/2005 | Bernatsky et al. | 280/250.1 |
| 2005/0168033 | A1 | 8/2005 | Peterson | |
| 2006/0087098 | A1 * | 4/2006 | Peterson et al. | 280/304.1 |
| 2006/0087103 | A1 | 4/2006 | Schreiber et al. | |
| 2008/0067777 | A1 | 3/2008 | Dauw et al. | |
| 2008/0157501 | A1 * | 7/2008 | Moller | 280/250.1 |
| 2009/0079159 | A1 * | 3/2009 | Every | 280/250.1 |

FOREIGN PATENT DOCUMENTS

| | | | |
|---|---|---|---|
| DE | 8906096 | | 7/1989 |
| DE | 29705494 | U1 | 5/1997 |
| DE | 29816998 | | 11/1998 |
| DE | 29901471 | U1 | 7/1999 |
| DE | 19821021 | | 11/1999 |
| DE | 20316246 | U1 | 12/2003 |
| DE | 202004007928 | | 7/2004 |
| EP | 0255804 | | 2/1988 |
| EP | 0329002 | | 8/1989 |
| EP | 0761195 | A1 | 3/1997 |
| EP | 911009 | | 4/1999 |
| EP | 1116480 | | 7/2001 |
| EP | 1155669 | | 11/2001 |
| EP | 1598041 | | 11/2005 |
| EP | 1721592 | A2 | 11/2006 |
| FR | 2799641 | | 4/2001 |
| GB | 758830 | | 10/1956 |
| JP | 6114454 | | 4/1994 |
| JP | 09285495 | | 11/1997 |
| JP | 2001314452 | | 11/2001 |
| WO | WO9117077 | | 11/1991 |
| WO | WO9308782 | | 5/1993 |
| WO | WO2007121606 | | 11/2007 |

OTHER PUBLICATIONS

OFF CARR “fenice” Brochure; downloaded Dec. 17, 2008.

* cited by examiner

WHEELCHAIR FRAME AND WHEELCHAIR WITH CROSS-BRACE

CROSS REFERENCE TO RELATED APPLICATIONS

This application claims priority from U.S. Provisional Patent Application Ser. No. 61/008,806, filed Dec. 21, 2007, and entitled LIGHTWEIGHT WHEELCHAIR, and PCT application, entitled WHEELCHAIR FRAME AND WHEELCHAIR WITH CROSS-BRACE. This application is the National Phase of International Application PCT/EP2008/011016 filed Dec. 22, 2008 which designated the U.S. and that International Application was published in English under PCT Article 21(2) on Jul. 2, 2009 as International Publication Number WO 2009/080347. PCT/EP2008/011016 claims priority to U.S. Provisional Application No. 61/008,806, filed Dec. 21, 2007. Thus, the subject nonprovisional application claims priority to U.S. Provisional Application No. 61/008,806, filed Dec. 21, 2007. The disclosures of both applications are incorporated herein by reference.

TECHNICAL FIELD

This invention relates to lightweight wheelchairs. More particularly, this invention relates to cross-braces for use in lightweight frames for wheelchairs.

BACKGROUND OF THE INVENTION

Manual wheelchairs are comprised of a wheelchair frame that is supported on the ground by two front caster wheels and two rear drive wheels. The drive wheels are large relative to the front caster wheels. In lightweight wheelchairs, the drive wheels are configured to allow the user to propel and steer the wheelchair by rotating the large rear drive wheels by hand. The frame supports a seat for the wheelchair user. The frames are also configured for rigidity in order to provide a stable ride characteristic. Lightweight wheelchairs are also usually configured to be folded and disassembled for ease of transport.

In order to provide a rigid frame structure that can be folded, wheelchair frames for manual wheelchairs are commonly made of bent tubing of aluminum or other metals or alloys. The ability to fold the wheelchair is a competing design objective with creating frames that are rigid and lightweight. To aid in creating a rigid frame, wheelchairs often include opposed side frames connected by cross-braces. It would be advantageous if the arrangement and configuration of the cross-braces could be improved.

SUMMARY OF THE INVENTION

This invention relates to a wheelchair having a frame including left and right frame members. Each of the left and right frame members has a first leg configured to support a seat and a second leg configured to support front caster wheels. The first leg extends substantially horizontally and the second leg extends substantially downward from the first leg. A cross-brace is connected to the first legs of the left and right frame members and has end sections and a central section intermediate the end sections. The end sections are connected to the first legs. The central section has a non-circular cross-section.

This invention further relates to a frame assembly of a wheelchair having a base frame comprising spaced-apart side frame members having first legs that define a plane. Each of the first legs is adapted to support an axle plate that is configured to adjustably mount an axle tube to the base frame. A first cross-brace having ends is connected to the first legs and includes a central section that is offset from the plane of the first legs. The cross-brace central section has a non-circular cross section that includes a major dimension. The major dimension is generally parallel to and offset from the plane defined by the first legs.

This invention further relates to a wheelchair having a base frame including left and right frame members. Each frame member has a first leg configured to support a seat. A backrest frame is pivotally connected to the base frame and configured to be fixed in a generally parallel position relative to the base frame. The backrest frame includes left and right second frame members and a cross-brace. The cross brace has end sections and a central section intermediate the end sections. The end sections are connected to the left and right second frame members. The central section has a non-circular cross-section.

Various advantages of this invention will become apparent to those skilled in the art from the following detailed description of the preferred embodiment, when read in light of the accompanying drawings.

DETAILED DESCRIPTION OF THE INVENTION

Figure 1:
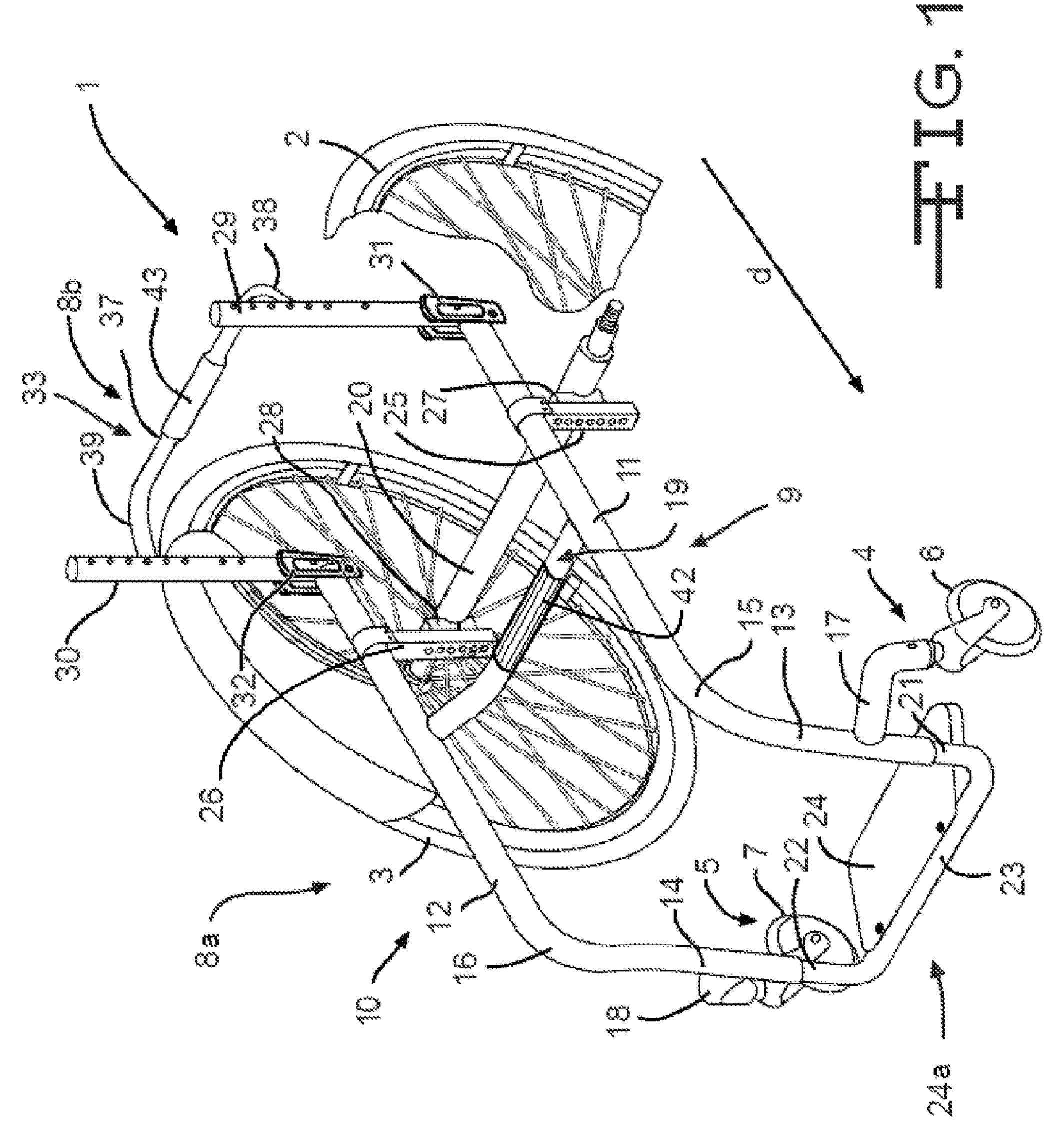
FIG. 1 is a perspective view of a wheelchair including a base frame having a cross-brace and a backrest frame having a cross-brace, with the seat, backrest, and one of the drive wheels partially removed for clarity.
Figure 2:
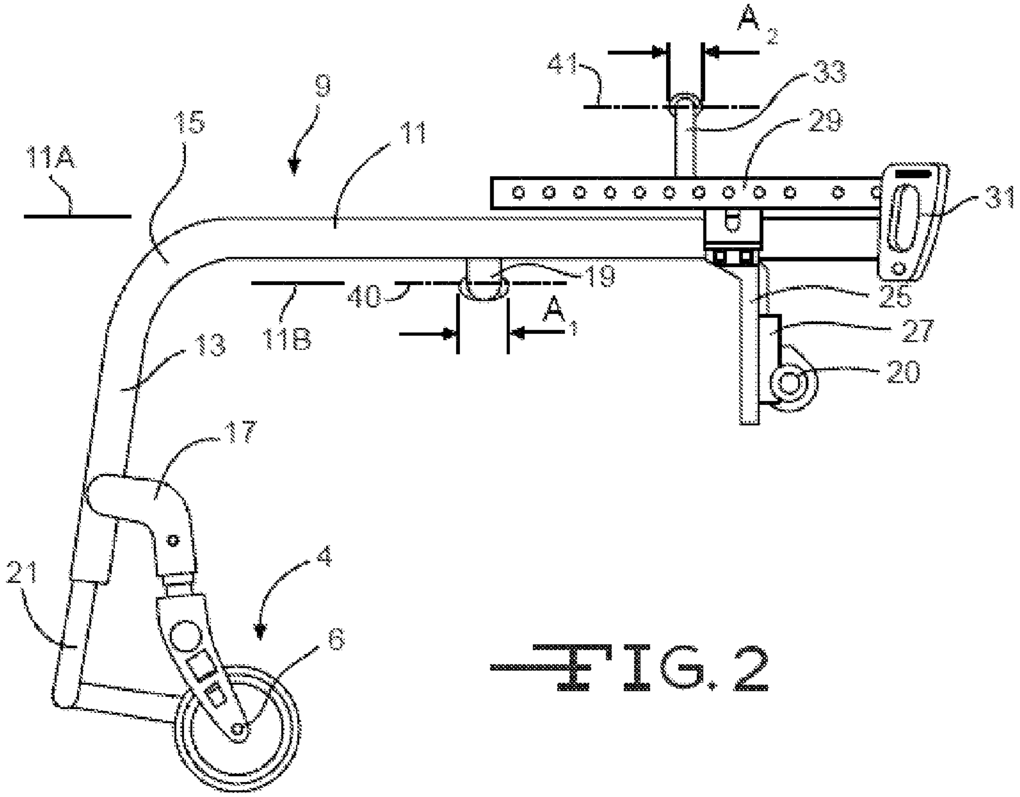
FIG. 2 is a side view of the wheelchair base frame.
Figure 3:
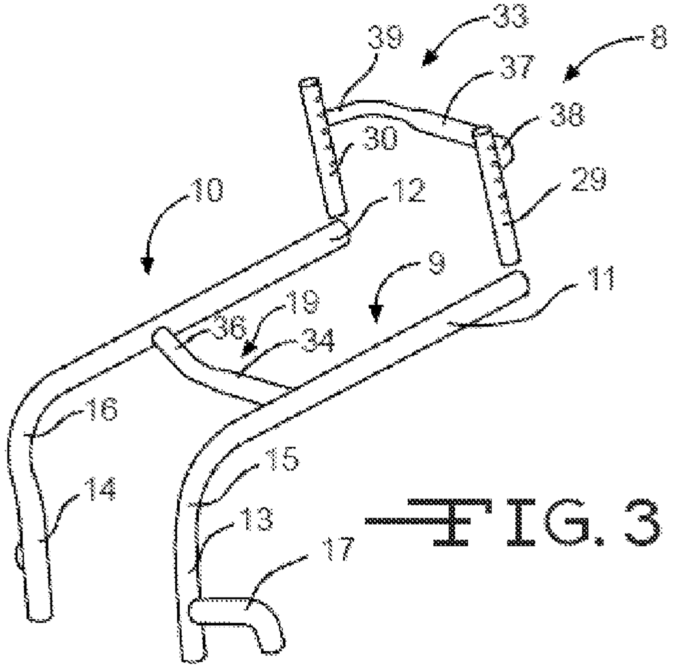
FIG. 3 is a perspective view having an upper and forward side orientation of the wheelchair frame and backrest frame.
Figure 4:
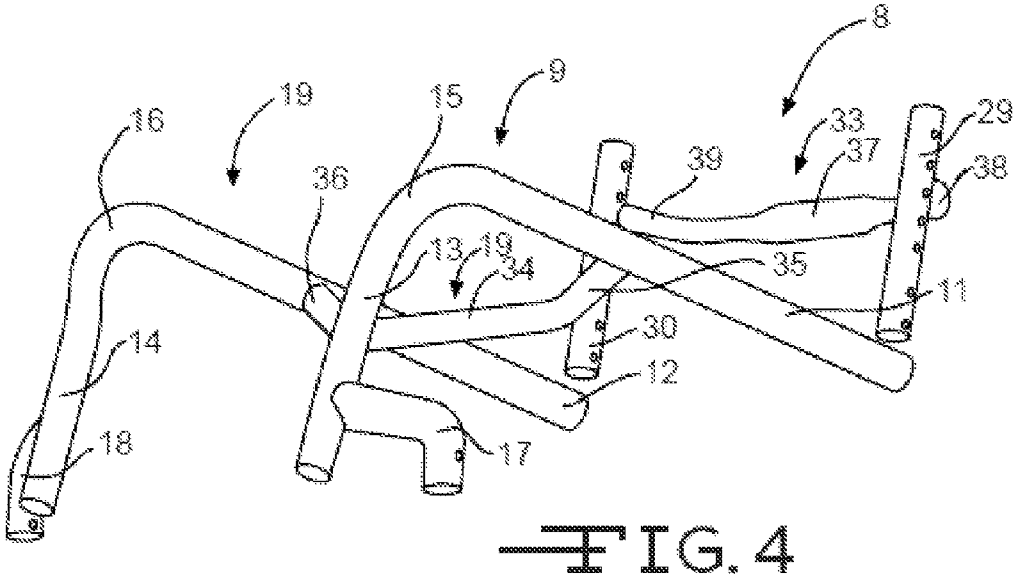
FIG. 4 is a second perspective view having a lower and forward side orientation of the wheelchair frame.
Figure 5:
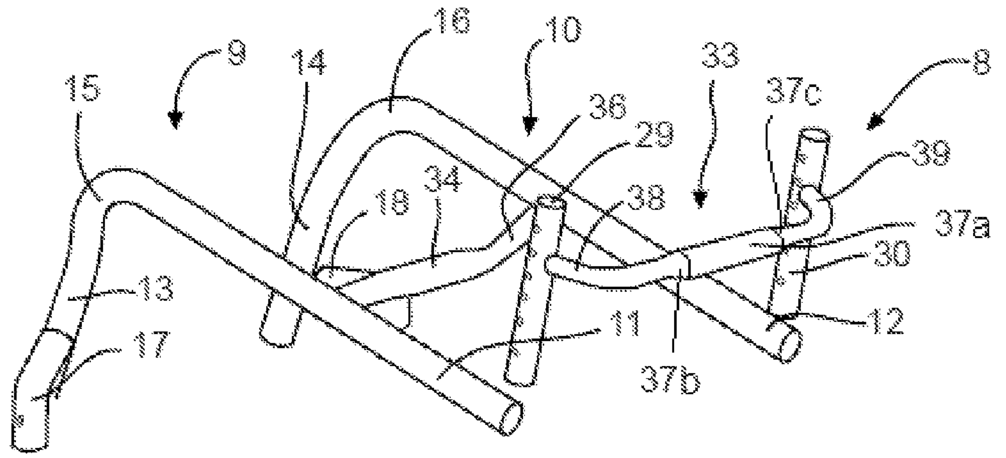
FIG. 5 is another perspective view having an upper and rearward side orientation of the wheelchair frame.
Figure 6:
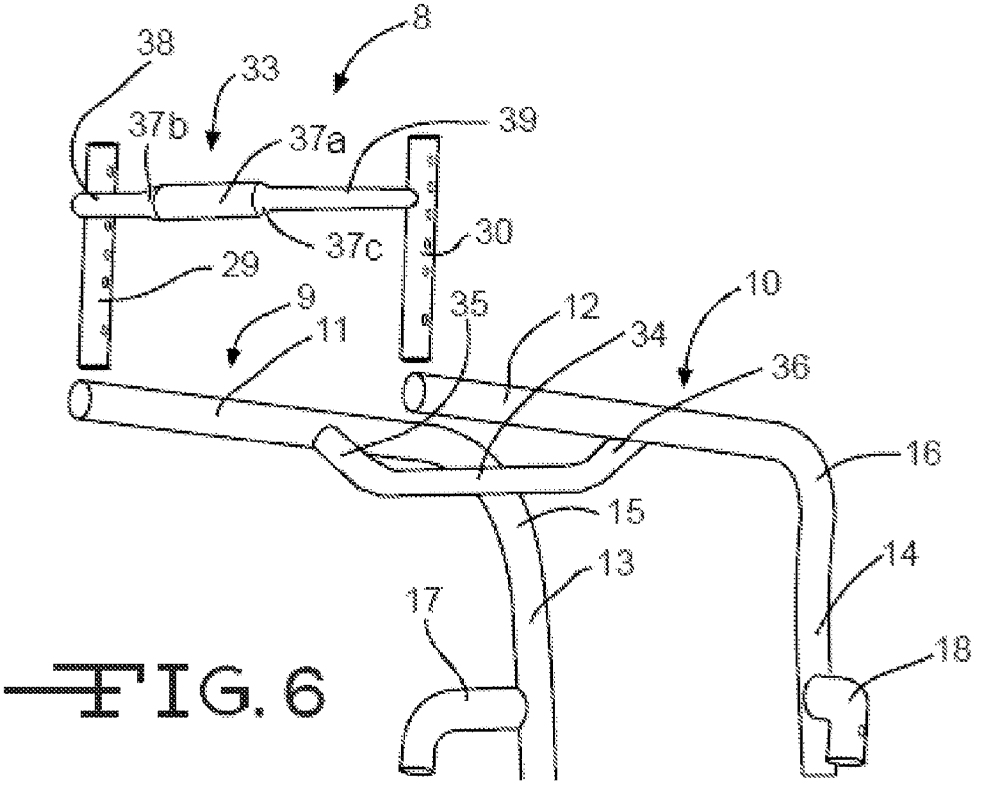
FIG. 6 is yet another perspective view having a lower and rearward side orientation of the wheelchair frame.

Referring to FIGS. 1-3, a wheelchair 1, shown here by way of example, is supported by left and right rear main wheels 2, 3 and left and right caster wheel assemblies 4, 5 including caster wheels 6, 7. The wheelchair 1 also includes a base frame **8*a* and a backrest frame 8*b*. The base frame 8*a* comprises left and right side frame members 9, 10, arranged on opposite sides of a longitudinal wheelchair central axis 48, and aligned with a direction d of forward displacement, or forward direction of the wheelchair 1. The left and right side frame members 9, 10** are generally L-shaped creating an open frame construction. The open frame configuration, generally, provides a lighter overall weight, but may create challenges in providing sufficient rigidity to bending loads imparted by a seated user.

The side frame members 9, 10 each include a longitudinally extending first leg 11, 12 and a downwardly extending second leg 13, 14. Each first leg 11, 12 transitions into one of the second legs 13, 14 by way of respective curved sections 15, 16. The first legs 11, 12 extend generally horizontally, and the second legs 13, 14 depend downwardly and forwardly. It is noted that the angle of the first legs 11, 12 to the horizontal can be adjusted by adjusting the height of the first legs 11, 12 relative to the ground. They are thus only predominantly oriented in a horizontal direction, but not exclusively oriented that way. Additionally, the directional labels such as downwardly, forwardly, horizontally, vertically, left, right and the like are for description purposes relative to the drawings and not limitations to the scope of the invention.

The first legs 11, 12 are arranged for supporting a seat (not shown) of the wheelchair 1. In particularly, a seat sling (not shown) can be slung between the first legs 11, 12 of the side frame members 9, 10, on top of which a seat cushion (not shown) of any suitable shape or configuration can be placed.

The curved sections 15, 16 of the side frame members 9, 10 are curved in multiple planes, such that the second legs 13, 14 are separated from each other by a shorter distance than the first legs 11, 12 of the side frame members 9, 10. Thus, the seat can be relatively wide, whereas the second legs 13, 14 of the side frame members 9, 10 contribute to providing support for the wheelchair occupant's legs.

The second legs 13, 14 are supported by the caster wheel assemblies 4, 5 via caster struts 17, 18 in which the caster wheel assemblies 4, 5 are partially accommodated. The caster struts 17, 18 are attached to the sides of the respective second legs 13, 14 at a position spaced above the lower ends of the second legs 13, 14. The wheelchair 1 has an open frame that is supported by the caster wheels 6, 7 only by way of the caster struts 17, 18 and second legs 13, 14. There is no other connection between the caster wheel assemblies 4, 5 and the first legs 11, 12 of the side frame members 9, 10.

In one embodiment the rear wheels 2, 3 are positioned as close together as possible, and in particular, as close to the side frame members 9, 10 as possible. The seat should be wide enough to accommodate an occupant comfortably, but, overall, the wheelchair 1 should be narrow for better maneuverability and access to buildings, transport means and the like. The narrow silhouette is enhanced if the set camber of the rear wheels 2, 3 is maintained when the wheelchair 1 is occupied. The side frames 9, 10 are configured as generally rigid structures to prevent "sagging", and in particular, resist rotation or torsion of the side frame members 9, 10, under the weight of the occupant. Otherwise, sagging would cause the wheels 2, 3 to angle inwards at the top towards the first legs 10, 11, and rub against them or against side guards (not shown).

To prevent such sagging, and to provide rigidity for the wheelchair base frame 8*a*, the first legs 11, 12 are directly connected by a first cross-brace 19, shown as a base frame cross-brace, and indirectly by an axle tube 20. Additionally, a footrest assembly 24*a* with left and right foot rest frame members 21, 22, in general alignment with and connected to the second legs 13, 14, includes at least one cross-member 23 interconnecting the left and right footrest frame members 21, 22. In the illustrated embodiment of FIG. 1, the cross-brace 23 is integrally formed with the left and right footrest frame members 21, 22, though such is not required. The cross-member 23 supports a foot plate 24 that may be a single plate, two plates, or indentations formed in the cross-member 23. In other embodiments, the cross-member 23 is eliminated and instead a different cross-member (not shown) is situated below the foot plate 24.

For adjustment of the height of the base frame 8*a* relative to the foot plate 24, it is contemplated that the left and right foot rest frame members 21, 22 of the foot rest assembly 24*a* be accommodated within the second legs 13, 14 in a telescoping manner. Other methods of connecting the foot rest frame members 21, 22 to the second legs 13, 14 may be used. The telescopic movement of the left and right foot rest frame members 21, 22 may be fixed in a desired position by any suitable means. In one embodiment, the foot rest frame members 21, 22 can be fixed within the second legs 13, 14 in one of a number of positions, and secured in place, for example, by biased pins in the foot rest frame members 21, 22, arranged to co-operate with any of a series of holes in the second legs 13, 14 of the side frame members 9, 10.

The first legs 11, 12 of the side frame members 9, 10 are each linked to the axle tube 20 by a respective axle plate 25, 26 to which a respective axle tube clamp 27, 28 is connected in one of a number of pre-determined positions on the axle plate 25, 26. The interconnection between the axle tube clamp 27, 28 and the axle plate 25, 26 allows for movement of the axle tube 20 between the different pre-determined positions at varying distances relative to the first legs 11, 12 of the side frame members 9, 10. The positions are at varying distances relative to the seat. In this manner, the rear seat height can be adjusted, because the axle tube 20 accommodates camber tubes (not shown in detail) for holding axles of the rear wheels 2, 3. At least one of the camber tube and the axle is removable from the axle tube 20, so that the rear wheels 2, 3 can be taken off the wheelchair frame when the wheelchair 1 needs to be transported, as is shown in FIG. 2.

The back rest frame 8*b* is pivotally connected to the base frame 8*a* by a connection mechanism comprising, in this example, left and right angle plates 31, 32, that enables left and right backrest frame members 29, 30 to be fixed in any of several angles relative to the first legs 11, 12 of the side frame members 9, 10. In particular, as shown in FIG. 2, the backrest frame members 29, 30 can be folded and fixed in a generally parallel position with the first legs 11, 12. In this configuration, the wheelchair 1 can be transported easily, e.g. in the trunk of a car. Optionally, the wheelchair 1 can be carried with one hand by the cross brace 19 between the side frame members 9, 10 or a second cross-brace 33, shown as a backrest cross-brace, provided between the backrest frame members 29, 30.

Figures 7, 8, 9:
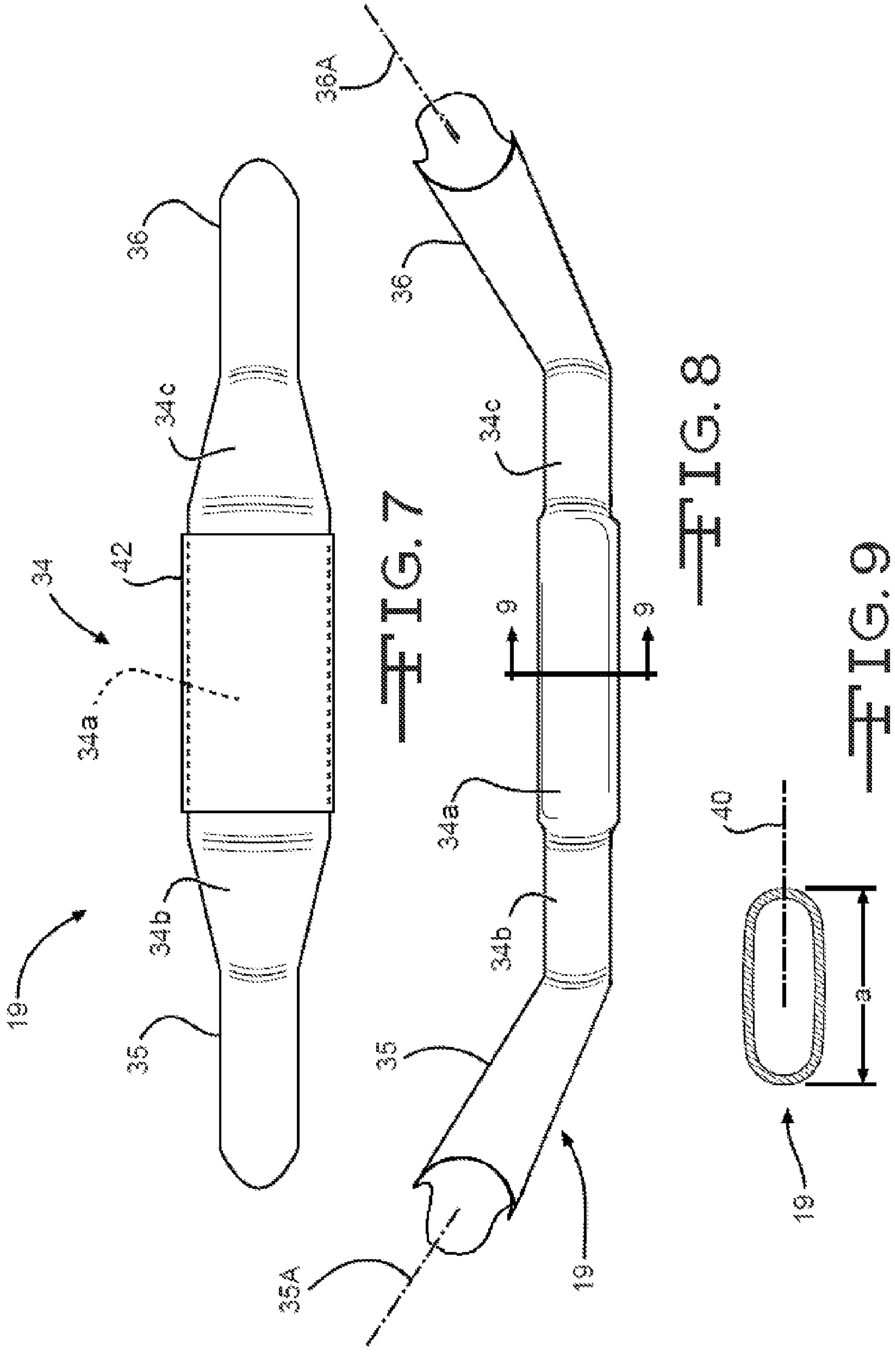
FIG. 7 is a bottom side, elevational view of the cross-brace.
FIG. 8 is an upper side, perspective view of the cross-brace of FIG. 7.
FIG. 9 is a cross-sectional view of the cross-brace taken along line 9-9 of FIG. 8.

As shown FIGS. 3-6, the first cross-brace 19 is comprised of a tubular structure having a central section, shown generally at 34, and first and second end sections 35, 36, respectively. The central section 34 comprises a generally elongated center portion 34*a* having a non-circular cross section and transition regions 34*b* and 34*c* that extend between the center portion 34*a* and the end sections 35 and 36. The transition regions are clearly illustrated in FIGS. 5 and 7 as generally triangular in shape. However, any suitable geometry capable of smoothly adapting from a non-circular cross section, such as an oval, to a round cross section may be used. The end sections 35, 36 terminate at the ends of the cross-brace 19, with the ends being connected to the left and right side frame members 11, 12. As shown in FIGS. 7-9, the end sections 35, 36 each have a central longitudinal axis 35A, 36A angled away from a plane 11A, shown in FIG. 2. The plane 11A is defined by the first legs 11, 12 of the left and right side frame members 9, 10, at least in the location where the cross-brace 19 joins the left and right side frame members 9, 10. Thus, the central section 34 lies in a plane 11B that is generally parallel to and offset from the plane 11A defined by the first legs 11, 12. Therefore, a space is created between the central section 34 of the cross-brace 19 and a seat supported by the left and right first legs 11, 12. By angling the end sections 35, 36 in this way, the central section 34 can be relatively long, and need not be held immediately under the middle of the seat. More particularly, the center portion 34*a* of the central section 34 may be made relatively long, if desired. In an alternative embodiment, the end sections 35, 36 are generally coplanar with the left and right first legs 11, 12. Curved sections (not shown), between the central section 34 and the end sections 35, 36, may be angled from this plane to create the offset between the central section 34 and the left and right first legs 11, 12.

Figure 10:
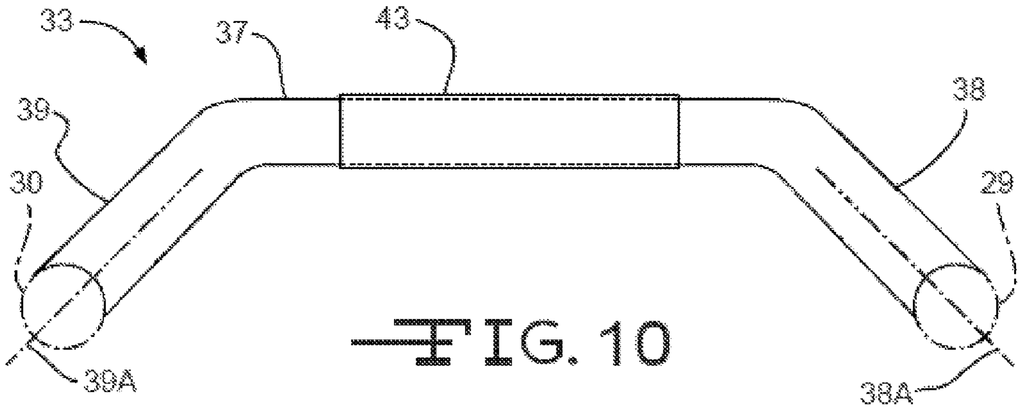
FIG. 10 is a plan view of the backrest cross-brace.

In a similar configuration to the first cross-brace 19, the second cross-brace 33 is comprised of a tubular structure having a central section 37 and first and second end sections 38, 39. The central section 37 comprises a generally elongated center portion 37*a* having a non-circular cross section and transition regions 37*b* and 37*c* that extend between the center portion 37*a* and the end sections 38 and 39. The transition regions are shown in FIG. 7 as being generally triangular in shape. However, any suitable geometry capable of smoothly adapting from a non-circular cross section, such as an oval, to a round cross section may be used. The end sections 38, 39 terminate at the ends of the cross-brace 33, with the ends being connected to the left and right side backrest frame members 29, 30. As shown in FIG. 10, the end sections 38, 39 each have a central longitudinal axis 38A, 39A, that is angled away from a plane defined by the backrest frame members 29, 30, at least where they join the left and right backrest frame members 29, 30. Thus, the central section 37 lies in a plane parallel to and offset from the plane defined by the backrest frame members 29, 30. Therefore, a space is formed between the central section 37 and a backrest (not shown), that is supported by the left and right backrest frame members 29, 30. By angling the end sections 38, 39 in this way, the central section 37 can again be relatively long. It should be appreciated, however, that the cross-brace 33 may be different in configuration from the cross-brace 19.

Referring again to FIG. 2, it can be seen that the central sections 34, 37 of the cross-braces 19, 33, respectively, have a non-circular cross-sectional shape. This is shown in FIG. 2 for cross-brace 33. Cross-brace 19 is shown to have a similar cross-section in FIGS. 7, 8, and 9. In this particular illustrated embodiment, the cross-sectional shapes are oval. In alternative embodiments, the cross sectional shapes may be another non-circular shape, e.g. tear-drop, elliptical, diamond-shaped, and the like. The first and second end sections 35, 36, 38, 39 may be generally circular in cross-section, as shown in these particular embodiments, though such is not required. They may have another cross-sectional shape that is different from that of the central sections 34, 37 in another embodiment, or they may also have an oval cross-section.

As shown in FIG. 2, the oval cross-sections of the central sections 34 and 37 have respective major dimentions $A_1$ and $A_2$ along respective major axes 40 and 41. The major axes 40 and 41 are oriented generally parallel to the plane 11A defined by the first legs 11, 12 and the plane defined by the left and right backrest frame members 29, 30, respectively. This major axis orientation is contrary to what one might expect if the function of the oval cross-section were primarily to provide extra strength. However, the central sections 34 and 37 are oriented for use as a handhold, with the flat part lying in the hand of the person picking up the wheelchair frame by one of the cross-braces 19 or 33. The cross-brace 19 may be positioned close to the center of gravity, at least in longitudinal direction. As the cross-brace position moves away from the center of gravity, the frame tends to turn under the effect of gravity when held by the cross-brace. To prevent this rotation about the cross-brace in a person's hand or hands when carried, the non-circular cross-section provides a reaction or leverage point to better resist this motion. Thus, the wheelchair frame can be carried more comfortably, particularly if the rear wheels are removed.

Additionally, by angling the end sections 34, 35, 38, 39 of the cross-brace 19, 33 away from a plane defined by the left and right frame members 11, 12, 29, 30 then the cross-brace is easier to access and hold, due to the added clearance provided from the seat or backrest. Consequently, there is more space for an arm or hand. Lateral stiffness of the frame 8*a*, 8*b* is provided by the longitudinal stiffness of the cross-brace. The angular orientation of, for example, the end sections 35, 36 relative to the central section 34 does not detrimentally affect the overall axial stiffness of the cross-brace 19 as a frame stiffening member.

The backrest frame 8*b* can be folded to a position in which the left and right second frame members 29, 30 lie essentially alongside the first legs 11, 12 of the left and right frame members 9, 10. Since the backrest frame 8*b* can be fixed in the folded position, the entire frame 8*a* and 8*b* can be lifted up by the backrest cross-brace 33. This cross-brace 33 may also be positioned close to the wheelchair center of gravity, at least in the longitudinal direction. Any residual offset of the center of gravity to the cross-brace 33, causing the folded base and backrest frame assembly to turn as it is being carried, is easily counteracted by a user's grasp of the non-circular shape of the cross-brace central section 37. Thus, the wheelchair frame can be carried more comfortably, particularly if the rear wheels are removed.

Referring again to FIG. 1, the central sections 34, 37 are covered by coverings 42, 43 made of a material that enhances the grip of the user on the cross-brace 19, 33. This material can be rubber or plastic, and optionally can be textured with a pattern that further increases friction between the hand and the cross-brace 19, 33. This material can be glued on as patches or completely surround the center portion 34*a*, 37*a* of the respective central sections 34, 37. It need not be provided along the entire length of the center portion 34*a*, 37*a* of the respective the central section 34, 37. It is also to be understood that the covering 42, 43 is optional.

FIG. 2 further shows that the major dimensions $A_1$, $A_2$ of each central section 34, 37 is generally larger than the diameter of the first and second end sections 35-36, 39-38, respectively. A minor dimension, which is generally oriented perpendicularly to the major dimension, can also be larger than that of the end sections 35-36, or 39-38, respectively. For example, the major dimension $A_1$ may be the larger diameter of an oval shape and the minor dimension may be the smaller diameter of the oval shape.

To produce the cross-braces 19, 33, one method starts with a piece of generally straight tubing. The ends of the tubing that form the end sections 35-36, or 39-38, respectively, are reduced in diameter. Next, the central sections 34, 37 are then formed into the oval shape. The end sections 35-36, or 39-38, respectively, are then bent to the required angles, whereupon the ends of the first cross-brace 19 are bonded, chemically or thermally, e.g. welded, to the first legs 11, 12 of the side frame members 9, 10. The ends of the second cross-brace 33 are bonded to the left and right backrest frame members 29, 30.

Like the other members of the wheelchair frame, the cross-braces 19, 33 can be made of a composite material or a metal or metal alloy. Suitable materials include aluminum-scandium alloys, aluminum alloys from the 7000 series, particularly aluminum 7003, or aluminum from the 6000 series. Aluminum 7000 has a relatively high tensile strength.

The cross-braces 19, 33 contribute to a strong frame that can be handled relatively easily and comfortably. The invention, however, is not limited to the embodiments described above, which may be varied within the scope of the claims. It is, for example, possible to provide more than one cross-brace 19 between the first legs 11, 12 of the side frame members 9,

10 or the backrest frame members 29, 30. It is also possible to configure the wheelchair frame 8*a* such that the second legs 13, 14 are pivotable relative to the first legs 11, 12. The second legs 13, 14 may be folded to a fixed position, generally parallel to the first legs 11, 12. A cross-brace of the kind described above may be provided between the second legs 13, 14. The end sections of this cross-brace may then be angled away from the plane defined by the second legs 13, 14, in order to accommodate the wheelchair occupant's legs and facilitate a compact folded configuration.

The principle and mode of operation of this invention have been described in its preferred embodiments. However, it should be noted that this invention may be practiced otherwise than as specifically illustrated and described without departing from its scope.

The invention claimed is:

1. A wheelchair having a frame including left and right frame members, each frame member having a first leg configured to support a seat, and a second leg configured to support front caster wheels, the first leg extending substantially horizontally and the second leg extending substantially downward from the first leg, and a cross-brace connected to the first legs of the left and right frame members, the cross-brace having end sections and a central section intermediate the end sections, the end sections being connected to the first legs, and the central section having a non-circular cross-section that is accessible as a handhold and provides leverage against gravitational rotation of the frame when carried by hand.

2. The wheelchair of claim 1 wherein the frame is a base frame and wherein a backrest frame is pivotally connected to the base frame and configured to be fixed in at least one of a plurality of positions relative to the base frame, the backrest frame including left and right second frame members and a cross-brace having end sections and a central section intermediate the end sections, the end sections being connected to the left and right second frame members, and the central section having a non-circular cross-section.

3. The wheelchair of claim 1 wherein the non-circular cross-section is an oval shaped center portion of the central section of the cross-brace, the oval shaped center portion having a major dimension that is generally parallel to a plane defined by the first legs of the first and second side frame members.

4. The wheelchair of claim 1 wherein the frame is a base frame that is pivotally connected to a backrest frame by left and right angle plates, the left and right angle plates being configured to fold and fix the backrest frame in a generally parallel orientation relative to the first legs of the base frame such that the central section is accessible as a handhold that is configured to resist rotation about a center of gravity of the wheelchair during transport.

5. The wheelchair of claim 1 wherein the frame cross-brace central section includes transition regions that connect a center portion having a generally oval cross section to the end sections having generally circular cross sections.

6. The wheelchair of claim 3 wherein the major dimension of the oval shaped central section of the frame cross-brace is offset from the plane defined by the first legs of the frame toward an axle tube such that a space is formed between the plane of the frame first legs and the cross-brace central section, the space being configured to access the central section which functions as the handhold.

7. The wheelchair of claim 2 wherein the backrest frame cross-brace central section includes transition regions that connect a center portion having a generally oval cross section to the end sections having generally circular cross sections.

8. The wheelchair of claim 4 wherein the oval shaped center portion of the central section of the backrest frame cross-brace has a major dimension that is generally parallel to a plane defined by the first legs of the first and second side frame members when the backrest is fixed in a folded position.

9. The wheelchair of claim 7 wherein the major dimension of the oval shaped center portion of the central section of the backrest frame cross-brace is offset from a plane defined by left and right second frame members when the backrest frame is fixed in a folded position such that a space is formed between the plane of the backrest frame second frame members and the cross-brace central section, the space being configured to access the backrest cross-brace central section such that the central section functions as a handhold.

10. The wheelchair of claim 2 wherein the central section of at least one of the base frame cross-brace and the backrest frame cross-brace is covered with a material configured to provide an improved grip during transport.

11. A frame assembly of a wheelchair having a base frame comprising spaced-apart side frame members having first legs that define a plane, each first leg being adapted to support an axle plate, the axle plates being configured to adjustably mount an axle tube to the base frame, a first cross-brace having ends connected to the first legs and a central section that is offset from the plane of the first legs, the cross-brace central section having a non-circular cross section that includes a major dimension that is generally parallel to and offset from the plane defined by the first legs.

12. The frame assembly of claim 11 wherein the first legs further support a backrest frame having left and right second frame members that are connected by a backrest cross-brace, the left and right second frame members defining a plane such that the major dimension of the non-circular central section of the backrest frame cross-brace is generally parallel to and offset from the plane defined by the left and right second frame members.

13. The frame assembly of claim 12 wherein the backrest frame is pivotally connected to the base frame by left and right angle plates such that the backrest frame can be folded between a use position and a transport position that is generally parallel to the base frame first legs.

14. The frame assembly of claim 13 wherein the first legs of the base frame support second legs, the second legs being configured to telescopically receive first and second footrest frame members, the footrest frame members being interconnected by a footrest cross-brace.

15. The frame assembly of claim 14 wherein the base frame is an open frame such that the first legs transition to the second legs by integrally formed curved sections such that the spacing between the first legs is greater than the spacing between the second legs, and the axle tube supports rear wheels for relative rotation and the second legs support caster assemblies having caster wheels that are spaced from the second legs such that the rear wheels are generally coplanar with the caster wheels.

16. A wheelchair having a base frame including left and right frame members, each frame member having a first leg configured to support a seat, and a backrest frame pivotally connected to the base frame and configured to be fixed in a generally parallel position relative to the base frame, the backrest frame including left and right second frame members and a cross-brace having end sections and a central section intermediate the end sections, the end sections being connected to the left and right second frame members, and the central section having a non-circular cross-section that is configured as a handhold that provides a leverage point to resist rotation of the wheelchair under the effect of gravity as the wheelchair is carried by hand.

17. The wheelchair of claim 16 wherein the backrest cross-brace central section includes transition regions that connect a center portion having a generally oval cross section to the end sections having generally circular cross sections.

18. The wheelchair of claim 17 wherein the backrest frame is pivotally connected to the base frame by left and right angle plates that are configured to fold and fix the backrest frame in a generally parallel orientation relative to the first legs of the base frame, the center portion being spaced from a plane defined by the left and right second frame members and being accessible as the handhold.

19. The wheelchair of claim 18 wherein the center portion of the central section has a major dimension that is generally parallel to a plane defined by the first legs of the first and second side frame members when the backrest is fixed in a folded position, the center portion being covered with a material configured to provide an improved grip during transport.

20. The wheelchair of claim 19 wherein the base frame includes a cross-brace having ends that connect the left and right frame members.

21. A wheelchair having a frame including left and right frame members, each frame member having a first leg configured to support a seat, and a second leg configured to support front caster wheels, the first leg extending substantially horizontally and the second leg extending substantially downward from the first leg, and a cross-brace connected to the first legs of the left and right frame members, the cross-brace having end sections and a central section intermediate the end sections, the end sections being connected to the first legs, and the central section having an oval shaped center portion, the oval shaped center portion having a major dimension that is generally parallel to a plane defined by the first legs of the first and second side frame members and offset from the plane toward an axle tube such that a space is formed between the plane of the frame first legs and the cross-brace central section, the space being configured to access the central section such that the central section functions as a handhold.

22. A wheelchair having a base frame including left and right frame members and a backrest pivotally connected to the base frame, each base frame left and right frame member having a first leg configured to support a seat, and a second leg configured to support front caster wheels, the first leg extending substantially horizontally and the second leg extending substantially downward from the first leg, and a base frame cross-brace connected to the first legs of the left and right frame members, the base frame cross-brace having end sections and a central section intermediate the end sections, the end sections being connected to the first legs, and the central section having a non-circular cross-section, the backrest frame being configured to be fixed in at least one of a plurality of positions relative to the base frame, the backrest frame including left and right second frame members and a backrest cross-brace having end sections and a central section intermediate the end sections, the end sections having generally circular cross sections and being connected to the left and right second frame members, the central section having a center portion with a generally oval cross section and transition regions that connect the center portion to the end sections, wherein a major dimension of the oval shaped center portion of the central section of the backrest frame cross-brace is offset from a plane defined by left and right second frame members when the backrest frame is fixed in a folded position such that a space is formed between the plane of the backrest frame second frame members and the cross-brace central section, the space being configured to access the backrest cross-brace central section such that the central section functions as a handhold.

* * * * *